(12) United States Patent
Clark et al.

(10) Patent No.: US 8,091,644 B2
(45) Date of Patent: *Jan. 10, 2012

(54) MICROEMULSION OR IN-SITU MICROEMULSION FOR RELEASING STUCK PIPE

(75) Inventors: David E. Clark, Humble, TX (US);
Lirio Quintero, Houston, TX (US);
Thomas A. Jones, Cypress, TX (US);
Chad F. Christian, Houston, TX (US);
Alexander McKellar, The Woodlands, TX (US)

(73) Assignee: Baker Hughes Incorporated, Houston, TX (US)

( * ) Notice: Subject to any disclaimer, the term of this patent is extended or adjusted under 35 U.S.C. 154(b) by 2 days.

This patent is subject to a terminal disclaimer.

(21) Appl. No.: 12/203,306

(22) Filed: Sep. 3, 2008

(65) Prior Publication Data
US 2008/0314592 A1 Dec. 25, 2008

Related U.S. Application Data

(60) Continuation-in-part of application No. 11/866,486, filed on Oct. 3, 2007, and a continuation-in-part of application No. 11/541,860, filed on Oct. 2, 2006, now Pat. No. 7,687,439, which is a division of application No. 11/218,822, filed on Sep. 2, 2005, now Pat. No. 7,134,496.

(60) Provisional application No. 60/606,959, filed on Sep. 3, 2004, provisional application No. 60/850,739, filed on Oct. 11, 2006.

(51) Int. Cl.
*E21B 37/08* (2006.01)
(52) U.S. Cl. ..................... 166/311; 166/305.1

(58) Field of Classification Search ................ None
See application file for complete search history.

(56) References Cited

U.S. PATENT DOCUMENTS

| | | | |
|---|---|---|---|
| 3,504,744 A | 4/1970 | Davis, Jr. et al. |
| 3,804,760 A | 4/1974 | Darley |
| 4,036,300 A | 7/1977 | Holm et al. |
| 4,125,156 A | 11/1978 | Glinsmann |

(Continued)

FOREIGN PATENT DOCUMENTS

GB 2347682 9/2000

(Continued)

OTHER PUBLICATIONS

J. Harrison; "Microemulsion Technology for Surfactants," Specialty Chemicals Magazine, Nov. 2004, pp. 32, 34, 36.

(Continued)

*Primary Examiner* — Angela M DiTrani
(74) *Attorney, Agent, or Firm* — Mossman Kumar & Tyler (57) ABSTRACT

Nanoemulsion, macroemulsions, miniemulsions, microemulsion systems with excess oil or water or both (Winsor I, II or III phase behavior) or single phase microemulsions (Winsor IV) improve the removal of filter cakes formed during hydrocarbon reservoir wellbore drilling with OBM. Such filter cakes and their particles can contact, impact and affect the movement of the drill string undesirably resulting in a "stuck pipe" condition. The macroemulsion, nanoemulsion, miniemulsion, microemulsion systems with excess oil or water or both or single phase microemulsion removes oil and solids from the filter cake, thereby releasing the drill string from its stuck condition. In one non-limiting embodiment, the emulsion system may be formed in situ (downhole) rather than produced or prepared in advance and pumped downhole.

15 Claims, 5 Drawing Sheets

U.S. PATENT DOCUMENTS

| | | | |
|---|---|---|---|
| 4,614,235 A * | 9/1986 | Keener et al. | 166/301 |
| 4,882,075 A | 11/1989 | Jones | |
| 5,189,012 A | 2/1993 | Patel et al. | |
| 5,286,386 A | 2/1994 | Darian et al. | |
| 5,707,939 A | 1/1998 | Patel | |
| 5,811,383 A | 9/1998 | Klier et al. | |
| 5,830,831 A * | 11/1998 | Chan et al. | 507/211 |
| 5,869,433 A | 2/1999 | Patel | |
| 6,581,687 B2 | 6/2003 | Collins et al. | |
| 6,593,279 B2 | 7/2003 | Von Krosigk et al. | |
| 6,613,720 B1 | 9/2003 | Feraud et al. | |
| 6,672,388 B2 | 1/2004 | McGregor et al. | |
| 6,793,025 B2 | 9/2004 | Patel et al. | |
| 7,134,496 B2 * | 11/2006 | Jones et al. | 166/278 |
| 7,222,672 B2 * | 5/2007 | Blauch et al. | 166/278 |
| 2003/0166472 A1 | 9/2003 | Pursley et al. | |
| 2004/0063795 A1 * | 4/2004 | VonKrosigk et al. | 516/38 |
| 2004/0140094 A1 | 7/2004 | Todd et al. | |
| 2004/0147404 A1 | 7/2004 | Thaemlitz et al. | |
| 2004/0259738 A1 | 12/2004 | Patel | |
| 2005/0239664 A1 | 10/2005 | Patel et al. | |
| 2006/0073986 A1 * | 4/2006 | Jones et al. | 507/129 |
| 2006/0096757 A1 * | 5/2006 | Berry et al. | 166/291 |
| 2006/0211593 A1 | 9/2006 | Smith et al. | |
| 2006/0258541 A1 | 11/2006 | Crews | |

FOREIGN PATENT DOCUMENTS

| | | |
|---|---|---|
| WO | WO9905392 | 2/1999 |
| WO | WO9941342 | 8/1999 |
| WO | WO0100747 A | 1/2001 |
| WO | WO2006/051255 * | 5/2006 |
| WO | WO2006109016 | 10/2006 |

OTHER PUBLICATIONS

I. Lakatos et al.; "Potential of Different Polyamino Carboxylic Acids as Barium and Strontium Sulfate Dissolvers," SPE 94633, SPE European Formation Damage Conference, The Netherlands, May 25-27, 2005, pp. 1-8.

H.A. Nasr-El-Din et al.; "Evaluation of a New Barite Dissolver: Lab Studies," SPE 86501, SPE International Symposium and Exhibition on Formation Damage Control, Lafayette, Louisiana, Feb. 18-20, 2004, pp. 1-11.

T. Huang et al.; "Carbonate Matrix Acidizing Fluids at High Temperatures: Acetic Acid, Chelating Agents or Long-Chained Carboxylic Acids?", SPE 82268, SPE European Formation Damage Conference, The Hague, The Netherlands, May 13-14, 2003, pp. 1-8.

K. Holmberg; Micelles, Microemulsions, and Monolayers, Science and Technology, Chapter 7, "Quarter Century Progress and New Horizons in Microemulsions," 1998, pp. 161-192.

Jean-Louis Salager et al.; "Enhancing Solubilization in Microemulsions—State of the Art and Current Trends," Journal of Surfactants and Detergents, vol. 8, No. 1, Jan. 2005, pp. 3-21.

Jean-Louis Salager et al.; "Amphiphilic Mixtures versus Surfactant Structures with Smooth Polarity Transition across Interface to Improve Solubilization Performance," CESIO 2008—7th World Surfactant Congress Paris, Session: Design and Analisis—Paper No. O-A17, pp. 1-9.

Matilde Minana-Perez et al.; "Solubilization of polar oils with extended surfactants," Elsevier, Colloids and Surfaces, A: Physicochemical and Engineering Aspects 100 (1995), pp. 217-224.

Matilde Minana-Perez et al.; "Sobilization of polar oils in microemulsion systems," Progr Colloid Polym Sci (1995) 98, pp. 177-179.

Jean-Louis Salager et al.; Chapter 8, "Ionic Microemulsions," Reprinted from Handbook of Microemulsion Science and Technology, P. Kumar and K. L Mittal, eds., Marcel Dekker, New York (1999), pp. 247-280.

L. Quintero et al.; "One-Step Acid Removal of an Invert Emulsion," SPE 94604, SPE 6th European Formation Damage Conference, The Netherlands, May 25-27, 2005, pp. 1-9.

G. Penny et al.; "The Application of Microemulsion Additives in Drilling and Stimulation Results in Enhanced Gas Production," SPE 94274, 2005 SPE Production and Operations Symposium, Oklahoma, City OK, Apr. 17-19, 2005, pp. 1-9.

* cited by examiner

FIG. 4: Filtration Test Results
20% DFE 734 in 10 lb/gal (1.2 kg/liter) in $CaCl_2$ brine / *in situ* Single Phase Microemulsion Three-hour mud-off on 20 μm ceramic disc and leak-off valve open

FIG. 5: Filtration Test Results
**20% EXP 298 in 10 lb/gal (1.2 kg/liter) in NaBr brine / *in situ* Single Phase Microemulsion**
Three-hour mud-off on 20 μm ceramic disc and leak-off valve open FIG. 6: Filtration Test Results
20% EXP 298 in 10 lb/gal (1.2 kg/liter) in HCOOK brine / in-situ Single Phase Microemulsion
Three-hour mud-off on 20 μm ceramic disc and leak-off valve open

FIG. 7: Filtration Test Results
20% EXP 298 in 10 lb/gal (1.2 kg/liter) in CaCl$_2$ brine / in-situ Single Phase Microemulsion

Three-hour mud-off on 20 μm ceramic disc and leak-off valve open

FIG. 8

MICROEMULSION OR IN-SITU MICROEMULSION FOR RELEASING STUCK PIPE

CROSS-REFERENCE TO RELATED APPLICATIONS

This application is a continuation-in-part of U.S. Ser. No. 11/866,486 filed Oct. 3, 2007, which claims the benefit of U.S. Provisional Application No. 60/850,739 filed Oct. 11, 2006, and is a continuation-in-part of U.S. patent application Ser. No. 11/541,860 filed Oct. 2, 2006, which is a divisional application from U.S. patent application Ser. No. 11/218,822 filed Sep. 2, 2005, now issued Nov. 14, 2006 as U.S. Pat. No. 7,134,496, which in turn claimed the benefit of U.S. Provisional Application No. 60/606,959 filed Sep. 3, 2004.

TECHNICAL FIELD

The present invention relates to methods and compositions for releasing stuck pipe during the drilling of a wellbore using an oil based-mud, and more particularly relates, in one non-limiting embodiment, to methods and compositions for releasing stuck pipe using an emulsion, in particular microemulsions, including microemulsions formed in situ downhole.

BACKGROUND

Drilling fluids used in the drilling of subterranean oil and gas wells along with other drilling fluid applications and drilling procedures are known. In rotary drilling there are a variety of functions and characteristics that are expected of drilling fluids, also known as drilling muds, or simply "muds". The drilling fluid should carry cuttings from beneath the bit, transport them through the annulus, and allow their separation at the surface while at the same time the rotary bit is cooled and cleaned. A drilling mud is also intended to reduce friction between the drill string and the sides of the hole while maintaining the stability of uncased sections of the borehole. The drilling fluid is formulated to prevent unwanted influxes of formation fluids from permeable rocks penetrated and also often to form a thin, low permeability filter cake which temporarily seals pores, other openings and formations penetrated by the bit. The drilling fluid may also be used to collect and interpret information available from drill cuttings, cores and electrical logs. It will be appreciated that within the scope of the description and claims herein, the term "drilling fluid" also encompasses "drill-in fluids" and "completion fluids".

Drilling fluids are typically classified according to their base fluid. In water-based muds, solid particles are suspended in water or brine. Oil can be emulsified in the water. Nonetheless, the water is the continuous phase. Brine-based drilling fluids, of course are a water-based mud (WBM) in which the aqueous component is brine. Oil-based muds (OBM) are the opposite or inverse. Solid particles are suspended in oil, and water or brine is emulsified in the oil and therefore the oil is the continuous phase. Oil-based muds can be either all-oil based or water-in-oil macroemulsions, which are also called invert emulsions. In oil-based mud the oil may consist of any oil that may include, but is not limited to, diesel, mineral oil, esters, or alpha-olefins.

It is apparent to those selecting or using a drilling fluid for oil and/or gas exploration that an essential component of a selected fluid is that it be properly balanced to achieve the necessary characteristics for the specific end application. Because drilling fluids are called upon to perform a number of tasks simultaneously, this desirable balance is not always easy to achieve.

Filter cakes are the residue deposited on a permeable medium such as a formation surface when a slurry, suspoemulsion or suspension, such as a drilling fluid, is forced against the medium under pressure. Filtrate is the liquid that passes through the medium, leaving the cake on the medium. Cake properties such as cake thickness, toughness, slickness and permeability are important because the cake that forms on permeable zones in a wellbore can contact and wedge against downhole equipment and cause stuck pipe and other drilling problems. It will be appreciated that in the context herein, the term "filter cake" includes any oil, emulsion or invert emulsion part of the filter cake, and that the filter cake is defined herein as a combination of any added solids, if any, and drilled solids with the drilling fluid. It will also be understood that the drilling fluid, e.g. OBM is concentrated at the borehole face and partially inside the formation. Further, an open hole completion is understood to be a well completion that has no liner or casing set across the reservoir formation, thus allowing the produced fluids to flow directly into the wellbore. A liner or casing may be present in other intervals, for instance between the producing interval and the surface.

When a pipe or drill string is referred to as "stuck", there may be varying degrees of difficulty in moving or removing the drill string from the wellbore. At one extreme, "stuck pipe" may refer to an inability to move the drill string vertically in the well, although rotation may be possible, or it may be possible to rotate the pipe or lower it back into the wellbore. At the other extreme, it may not be possible to move the drill string in any way. It is not unusual for a stuck condition to start with the possibility of limited pipe rotation or restricted vertical movement, but degrade to an inability to remove the drill string at all. Often a small volume or pill of fluid is introduced into the wellbore annulus to free the differentially stuck pipe. Traditionally, oil-based mud is the spotting fluid. Speed in mixing and placing the spot or pill is very important to successfully freeing stuck pipe. These spots or pills free the stuck pipe by covering or coating the region. It is believed to break up the filter cake, allowing the pill or spot to migrate into cracks in the filter cake and between the drill string and the cake, reducing the size of the stuck area and permitting the pipe to be pulled free.

Many operators are interested avoiding stuck pipe situations, but since stuck pipe often occurs, they also need to have ready compositions and methods for releasing stuck pipe. It would be desirable if compositions and methods could be devised to aid and improve the ability to release stuck pipe, and to release it more quickly and completely, without disadvantages.

SUMMARY

There is provided, in one non-limiting form, a method for releasing a stuck drill string from a hydrocarbon reservoir wellbore that involves drilling a wellbore with a drill string into or within a hydrocarbon reservoir with an OBM and forming a filter cake of OBM particles over at least part of the wellbore, whether intentionally or unintentionally. The filter cake contacts and binds the drill string to prevent and/or undesirably inhibit movement of the drill string, that is, resulting in some degree of a "stuck pipe" condition. The method further involves contacting the OBM and filter cake with a composition for a period of time that is sufficient to remove at least a portion of the OBM filter cake particles to permit free movement of the drill string. The composition is an emulsion (e.g. a microemulsion, a miniemulsion or a nanoemulsion) or the components that will form a microemulsion in situ downhole. The pre-formed microemulsion includes at least one surfactant, a polar liquid and an oil. The components to form an in-situ emulsion in situ down-hole include at least one surfactant and a polar liquid. The in-situ composition formed in situ may be a miniemulsion, a nanoemulsion, a microemulsion in equilibrium with excess oil or water or both (Winsor III) and a single phase microemulsion (Winsor IV). The components to form the emulsion in situ thereby incorporate at least a portion of the oil in the filter cake particles into the in-situ fluid.

An acid may be optionally used to solubilize the bridging particles in the filter cake. The acid may be a mineral acid and/or an organic acid, and in one non-limiting embodiment may be a polyamino carboxylic acid (PACA). In another non-restrictive version, the acid may also be generated in situ. Solid particles may be solubilized by chelating agents or sequestering agents that form a complex with the divalent ions and reduces or avoid the precipitation of the divalent ion salts, such as calcium carbonate or barium sulfate.

There is additionally provided in an alternate embodiment a thermodynamically stable, macroscopically homogeneous, single phase microemulsion that includes a polar phase; a nonpolar phase; a surfactant; and optionally a co-surfactant and acid. Since the emulsion may be formed in situ, the polar phase may be from the OBM present in the wellbore and/or filter cake. In one non-limiting embodiment, in situ formed compositions are suitable because no additional non-polar fluids or materials need be pumped downhole to the stuck pipe region.

DETAILED DESCRIPTION

It has been discovered that an emulsion, particularly a microemulsion, or an in situ formed emulsion, such as a microemulsion, may be used as a spotting fluid for reversing the wettability of an oil-based mud (OBM) filter cake or synthetic-based mud (SBM) filter cake as a method for freeing "stuck pipe". A microemulsion is generally formed when a surfactant or a blend of surfactants, a polar phase (typically water or brine), and a non-polar phase (i.e. an organic phase) are mixed into a single bi-continuous mixture. An in-situ microemulsion is formed when a surfactant, often a blend of surfactants, and a polar phase (again, typically water or brine) comes into contact with the OBM and/or OBM filter cake and solubilizes the non-polar material therein. The benefits of an in-situ microemulsion include the facts that the fluid does not require any oil or solvents, and thus that the components have a higher capacity for oil incorporation. Additionally, microemulsions or in-situ microemulsions alter the solid particles within a filter cake from being oil-wet to water-wet. The resulting water-based filter cake is thus ideal for releasing "stuck pipe" with or without jarring of the pipe to facilitate release. In one non-limiting embodiment, the stuck pipe condition may be released upon pumping the microemulsion or components to form an in-situ microemulsion, as a spotting fluid or pill. Pills are defined herein as having 200 barrels (32 kiloliters) or less, although it should be appreciated that the volume will vary depending upon a number of interrelated factors, including, but not necessarily limited to, the size of the hole drilled.

Further, it is expected that alteration of a majority of filter cake particles may be accomplished by changing the OBM into a macroemulsion, a nanoemulsion, a miniemulsion, a microemulsion (Winsor III) and/or single phase microemulsion, such as Winsor IV or similar chemistry, as will be described in more detail. Single phase microemulsions may be defined as bi-continuous, O/W or W/O. In one non-limiting explanation of the inventive phenomenon, an O/W single phase microemulsion contacts the oil-based mud and filter cake and forms a water continuous (oil-in-water) microemulsion. It has been surprisingly discovered that this contacting may be accomplished without circulating the well, by which is meant pumping fluid through the whole active fluid system, including the borehole and all the surface tanks that constitute a primary system. It has also been discovered that the microemulsion (or other emulsion) may be formed in situ downhole. That is, it is not necessary to form the microemulsion in advance on the surface and pump it downhole. It is believed that this in situ microemulsion process encourages the solubilization of oil from the filter cake, thereby facilitating the release of a stuck or mobility-inhibited drill string. The literature generally describes these microemulsions as single phase microemulsions, but they may also be a microemulsion in equilibrium with excess water and/or oil phases, i.e. as a part of a three-phase system.

More specifically, the methods and compositions herein involve using an in-situ reaction fluid such as a microemulsion for removing oil-based mud (OBM) filter cake or synthetic oil-based mud (SBM) filter cake, and reversing the wettability and removing filter cakes and other materials that bind up drill strings and other equipment in wells drilled with SBMs or OBMs. The in-situ fluid (e.g. microemulsion, nanoemulsion, etc.) may be formed when at least one surfactant and a polar phase (usually, but not limited to water or brine) contacts the OBM and/or OBM filter cake and solubilizes the non-polar material of the OBM. It should be understood that as defined herein the term OBM encompasses SBMs.

One of the benefits of the in situ fluid formation is that the cleaning fluid does not require introducing any oil or solvent into the wellbore, which gives a higher capacity for oil incorporation or cleaning capability when contacted with the OBM filter cake that is inhibiting movement of the drill string. Another benefit is that solid particles of the filter cake may turn from oil-wet to water-wet. Additionally, a water-based filter cake is ideal for removal and dissipation when mineral acids, organic acids, oxidizing agents, water-soluble enzymes (e.g. catalysts), chelating agents and in-situ acid generators are spotted into a wellbore after or during the filter cake wettability reversal process. As the OBM (or SBM) filter cake is converted from oil-wet to water-wet during the in situ formation of a fluid, such as a microemulsion or nanoemulsion, the blend of surfactants and a polar phase (e.g. water) may also contain acids, dissolvers (chelating agents) of divalent salts (calcium carbonate, magnesium or barium sulfate, etc.) or other precursor additives that can dissolve the carbonate or barite particles and break down the polymeric fluid loss additive (if present). In many cases, the surfactant may be a surfactant blend and often a surfactant-cosurfactant mixture, in which the cosurfactant is a short amphiphilic substance such as an alcohol (in non-limiting examples, propanol, butanol, pentanol, hexanol, in their different isomerization structures) as well as glycols, and ethoxyated and propoxylated alcohols or phenols.

The use of this in-situ fluid (e.g. single phase microemulsion, nanoemulsion, miniemulsion, etc.) chemistry in releasing stuck pipe optionally allows the direct contact of a chelating agent, including, but not necessarily limited to, an acid and/or an acid blend mixed in conventional brine completion fluids (or generated in situ), without causing a high viscosity oil continuous emulsion (sludge) and formation blockage. The action of the in situ formed fluid alters the deposited filter cake which allows a chelating agent such as an acid or a salt of an acid, such as a polyamino carboxylic acid (PACA) and/or a mineral acid or salt thereof, e.g. hydrochloric acid or an organic acid or salt thereof, e.g. acetic acid, or other acid, to solubilize the filter cake particles and other particles, such as manganese tetroxide, calcium carbonate, hematite, ilmenite, and barite. Bridging particles composed of these materials may be treated with an in-situ fluid (e.g. a single phase microemulsion) plus acid blend, providing that the acid is an organic acid in one non-limiting embodiment. It has been found that PACAs perform relatively better in an alkaline environment as the salt of these acids, which further differentiates them from the more common acids and salts thereof.

For instance a salt of PACA dissociates barium sulfate from the calcium carbonate treated; the PACA takes on the cation. In a non-limiting example, a Na or K salt of PACA when contacting calcium carbonate contacts and dissolves the barium salt through cationic exchange. The salt forms of PACAs perform relatively better than the plain acid form, but the non-salt acid form still performs the functions and achieves the desired results of the methods and compositions herein. The plain acid form works somewhat better at relatively low pH.

The net effect of such a treatment system will improve an operator's chance of releasing the stuck drill string quickly and easily. In either case, skin (filter cake) alteration is accomplished by creating the in-situ fluid (e.g. single phase microemulsion) across the injection/production interval. The in-situ fluid (e.g. single phase microemulsion) may be used for any procedure to release or free a drill string or other equipment being bound up or undesirably inhibited in its movement downhole, particular when OBM filter cake is involved.

In brief, one non-limiting embodiment OBM stuck pipe release technology herein, also referred to as "one-step" pipe release, utilizes in-situ single phase microemulsion, e.g., and optional chelating agent techniques in a single blend to change the oil or invert emulsion of an OBM filter cake to a microemulsion (or in other in-situ fluid) and simultaneously decompose its acid soluble components. Altering the filter cake using an in situ single phase microemulsion (or in other in-situ fluid) facilitates the elimination of solids as solubilized in the aqueous solution component of the in-situ fluid thus preventing the occurrence of a sludge that could form between the chelating agent and OBM cake.

It will be appreciated that it is not necessary for all of the particles to be removed and/or solubilized from a filter cake for the inventive method and its compositions to be considered successful. Success may be defined as removing enough of the particles so that movement of the drill string or other equipment is restored or occurs to a sufficient extent to continue operations. Alternatively, success is obtained if more particles are removed using the pre-formed microemulsion or in-situ fluid (e.g. single phase microemulsion) than if it is not used, or if more particles are removed using the in-situ fluid together with a chelating agent, as compared to the case where no in-situ fluid and/or chelating agent is used. Alternatively, the method is considered successful if at least a portion of the filter cake particles are removed, but the equipment is released nonetheless. In one non-limiting embodiment at least a majority (>50%) of the filter cake particles are removed. In general, of course, it is desirable to remove as much of the OBM and filter cake as possible.

Microemulsions are thermodynamically stable, macroscopically homogeneous mixtures of at least three components: a polar phase (usually, but not limited to, water) and a nonpolar phase (typically an organic phase) and a surfactant, often more than one surfactant, for instance with a co-surfactant such as an alcohol, glycol or phenol, or their ethoxy derivatives, particularly when ionic surfactants are used, as mentioned in the reference: J. L. Salager and R. E. Anton, "Ionic Microemulsions", Chapter 8, in P. Kumar and K. L. Mittal, ed. *Handbook of Microemulsion Science and Technology*, Marcel Dekker Inc. New York 1999, pp. 247-280. Microemulsions form spontaneously and differ markedly from the thermodynamically unstable macroemulsions, which depend upon intense mixing energy for their formation. Microemulsions are well known in the art, and attention is respectfully directed to S. Ezrahi, A. Aserin and N. Garti, "Chapter 7: Aggregation Behavior in One-Phase (Winsor IV) Microemulsion Systems", in P. Kumar and K. L. Mittal, ed., *Handbook of Microemulsion Science and Technology*, Marcel Dekker, Inc., New York, 1999, pp. 185-246.

The referenced chapters describe the types of microemulsion phase formulations defined by Winsor: Winsor I, Winsor II and Winsor III. A system or formulation is defined as: Winsor I when it contains a microemulsion in equilibrium with an excess oil phase; Winsor II when it contains a microemulsion in equilibrium with excess water; and Winsor III when it contains a middle phase microemulsion in equilibrium with excess water and excess oil. The author also describes Winsor IV as a single-phase microemulsion, with no excess oil or excess water. Although not wishing to be limited by any one theory, it is believed that the microemulsions formed in the methods described herein are of the Winsor IV type, which means the entire system is a microemulsion phase. The thermodynamically stable single phase Winsor IV microemulsion could evolve by a change in formulation or composition into the formation of a miniemulsion or nanoemulsion, which is a two-phase system with submicron size droplets which could be stable for long period of time, but not permanently stable as a microemulsion, as explained in reference J. L. Salager, "Emulsion Phase Inversion Phenomena" in *Emulsions and Emulsion Stability*, J. Sjöblöm Ed., 2nd Edition, Chap. 4, pp. 185-226, Taylor and Francis, London (2006).

Surfactants suitable for creating the in-situ fluids (e.g. single phase microemulsions) of the stuck pipe release methods include, but are not necessarily limited to non-ionic, anionic, cationic and amphoteric surfactants and in particular, blends thereof. Co-solvents or co-surfactants such as alcohols are optional additives used in the microemulsion formulation. Suitable nonionic surfactants include, but are not necessarily limited to, alkyl polyglycosides, sorbitan esters, methyl glucoside esters, amine ethoxylates, diamine ethoxylates, polyglycerol esters, alkyl ethoxylates, alcohols that have been polypropoxylated and/or polyethoxylated or both. Suitable anionic surfactants include alkyl ether sulfate, alkyl ether sulfonates, alkali metal alkyl sulfates, alkyl sulfonate, alkyl disulfonate, alkyl disulfate, and alkyl sulfosuccinate. Suitable cationic surfactants include, but are not necessarily limited to, arginine methyl esters, alkanolamines and alkylenediamides. In one non-limiting embodiment at least two surfactants in a blend may be used to create single phase microemulsions in situ, as well as the other in-situ fluids. Suitable surfactants may also include surfactants containing a non-ionic spacer-arm central extension and an ionic or nonionic polar group. The non-ionic spacer-arm central extension may be the result of polypropoxylation, polyethoxylation, or a mixture of the two, in non-limiting embodiments. In one non-limiting embodiment, the co-solvent or co-surfactant has an absence of a propionate.

In another non-restrictive embodiment, the in-situ fluid formulation (e.g. macroemulsion, nanoemulsion, etc.) may contain a co-surfactant which may be an alcohol having from about 3 to about 10 carbon atoms, in another non-limiting embodiment from about 4, independently up to about 6 carbon atoms. A specific example of a suitable co-surfactant includes, but is not necessarily limited to, n-butanol and propanol, or sec-butanol.

In one non-restrictive version, the in-situ fluid (e.g. single phase microemulsion) contains a non-polar liquid, which may include a synthetic fluid including, but not necessarily limited to, ester fluids; paraffins (such as PARA-TEQ™ fluids from Baker Hughes Drilling Fluids) and isomerized olefins (such as ISO-TEQ™ from Baker Hughes Drilling Fluids). However, diesel and mineral oils such as Escaid 110 (from Exxon) or ECD 99-DW oils (from TOTAL) can also be used as a non-polar liquid in preparing the fluid systems for use in the equipment release methods herein. As noted previously, an advantage of forming the fluids (e.g. nanoemulsion, single phase microemulsion, etc.) in situ is that less non-polar liquid needs to be used (as compared with a pre-formed microemulsion) since the non-polar liquid is found in the OBM (or SBM) filter cake itself. This gives a higher capacity for the microemulsion, e.g., to absorb the oil in the filter cake.

It will be appreciated that the amount of in-situ fluid to be created or formed and the amounts of in-situ-forming components (polar, nonpolar and a surfactant and co-surfactant mixture) to be added or included are difficult to determine and predict in general and in advance with much accuracy since it is dependent upon a number of interrelated factors including, but not necessarily limited to, the brine type, the particle type, the temperature of the formation where the stuck pipe has occurred, the particular surfactant or surfactant blend used, whether a chelating agent is present and what type, etc. Nevertheless, in order to give some idea of the quantities used, in one non-limiting embodiment, the proportion of non-brine components in the in-situ fluid (e.g. single phase microemulsion) may range from about 1 to about 50 volume %, from about 5, independently up to about 20 volume %.

It is expected that brine will be a common component of the in-situ fluid (e.g. single phase microemulsion), and any of the commonly used inorganic and organic brines, and salts to make them, are expected to be suitable in the compositions and methods useful to release stuck pipe. Although water is expected to be the polar liquid used to make the microemulsions in situ, it will be appreciated that other polar liquids such as alcohols and glycols, alone or together with water, may be used.

In the non-limiting embodiment where the in-situ fluid (e.g. single phase microemulsion) contains at least one chelating agent, the chelating agent should be capable of solubilizing or dissolving the particles that make up the filter cake. The chelating agent may be an inorganic acid or salt thereof including, but not necessarily limited to, hydrochloric acid, sulfuric acid, and/or an organic acids including, but not necessarily limited to, an organic agent or salt thereof, e.g. acetic acid, formic acid and mixtures thereof. In one non-limiting embodiment, the acid may be only one mineral acid or only one organic acid.

In most embodiments, the in-situ fluid may contain at some point a chelating agent that is a polyamino carboxylic acid (PACA) or a salt of PACA. Suitable PACAs and other chelating agents include, but are not necessarily limited to, nitrilotriacetic acid (NTA), ethylenediamine tetraacetic acid (EDTA), trans-1,2-diaminocyclohexane-N,N,N',N'-tetraacetic acid monohydrate (CDTA), diethylenetriamine pentaacetic acid (DTPA), dioxaoctamethylene dinitrilo tetraacetic acid (DOCTA), hydroxyethylethylenediamine triacetic acid (HEDTA), triethylenetetramine hexaacetic acid (TTHA), trans-1,2-diaminocyclohexane tetraacetic acid (DCTA), polyphosphates, pyrophosphates, alpha-ether carboxylates, oxy-diacetate salts, carboxymethyl tartronate (CMT) and oxy-succinate (CMOS), citric, tartaric and tartronic salts and mixtures thereof.

The concentration of chelating agent in the in-situ fluid (e.g. single phase microemulsion) has a lower limit of about 1 volume %, alternatively of about 5 volume %, and an upper limit of about 30 volume %, alternatively about 20 volume %, and in another non-restrictive embodiment up to about 15 volume %.

There are various ways by which the chelating agent may be delivered according to the method. The chelating agent may be introduced to the filter cake with the components to form the single phase microemulsion, e.g., in situ; or may be added after the in-situ fluid (e.g. single phase microemulsion) treatment; or may be added to the microemulsion soak solution once it is formed in place before removing the majority of the filter cake particles and OBM (e.g. invert emulsion) and combinations thereof.

Typical or expected particles expected to be treated, dissolved, removed or dispersed in the methods herein include, but are not necessarily limited to, calcium carbonate, hematite, ilmenite, manganese tetroxide, manganous oxide, iron carbonate, magnesium oxide, barium sulfate, and mixtures thereof.

With further specificity, the methods and compositions herein may concern one-trip stuck pipe spotting fluids designed to physically change an OBM (e.g. an invert emulsion) filter cake and acidify the acid soluble components on the cake. The method not only physically changes the nature of the deposited filter cake, the resulting oil components of the original filter cake which are incorporated into the single phase microemulsion (e.g.) formation in situ and then further micro-emulsified or absorbed, allow for ease of releasing the stuck equipment. With the conversion of the external oil to internal emulsified oil in water, plus the optional decomposition of minerals (e.g. particles e.g. calcium carbonate and other acid-soluble components) by chelating agents, most of the filter cake is either removed or micro-sized to the extent that only a minimal or reduced amount of filter cake components remain on a reservoir face and/or the equipment, so that the equipment may be released and moved normally to accomplish the further goals of hydrocarbon recovery, etc.

As noted, the in-situ fluid (e.g. microemulsion forming) soak solution may also contain acids, barite dissolvers (chelants) or other precursor additives that can dissolve the acid-soluble particles or dissolve the barite and break down the fluid loss additive (polymeric or otherwise). The value of such a conversion using a single soak solution with all its functional components is that the OBM (e.g. invert emulsion) filter cake may be converted to a water-based filter cake containing dissolvable particulates and fluid loss control additives that may be removed in a single operational step.

In another non-limiting embodiment, the salts suitable for use in creating the brine include, but are not necessarily limited to, inorganic salts as sodium chloride, potassium chloride, calcium chloride, sodium bromide, calcium bromide, and organic salts such as sodium formate, potassium formate, cesium formate, zinc bromide, sodium acetate, calcium acetate and combinations thereof. The density of the brines may range from about 8.4 lb/gal to about 15 lb/gal (about 1 to about 1.8 kg/liter), although other densities may be given elsewhere herein.

The in-situ fluid (e.g. single phase microemulsion or other emulsion) treatment may be composed of different brine and oil blends, depending on the required density of the fluid for the well. The optional acid, or PACA, or other chelating agent concentration may be varied as needed, including the type of additive or acid or chelating agent.

This technology does not require or discriminate against any OBM. In other words, the single phase microemulsion can be applied to filter cake clean up for any OBM system regardless of base oil type or emulsifier used to formulate the mud. This versatility allows an operator flexibility to formulate the drilling fluid based on wellbore needs. This is not the case in some prior methods whereby highly specific amine emulsifiers are needed because they require acid protonation to reverse the wettability. In the present technology, the optional chelating agent is only used for removal of acid soluble bridging components. In one non-limiting embodiment the methods and compositions are practiced in the absence of amine emulsifiers, such as resin amines and/or amine emulsifiers of the formula R—N—[(CH$_2$CH$_2$R'A)$_x$H]$_2$, such as those defined in U.S. Pat. Appln. Pub. No. 2004/0147404.

Another important feature relative to other stuck pipe release methods is that the oil phase of the OBM emulsion is micro-emulsified into the single phase microemulsion (or in other in-situ fluid, such as nanoemulsion, miniemulsion or single phase emulsion). The stuck pipe release process reduces the energy necessary for the microemulsion to form when compared to previous methods. This efficiency decreases the time required to complete the well.

The method will now be further discussed with respect to actual implementation of the fluids in Examples which are not intended to limit the invention, but simply to further illustrate it. Again, while the in-situ fluid may be referred to as a "microemulsion" or "single phase microemulsion", it should be appreciated that the methods and compositions are expected to apply to other in-situ fluids including, but not limited to miniemulsions, nanoemulsions, and all types of microemulsions.

A number of laboratory tests were performed using the inventive in situ microemulsion chemistry and Baker Oil Tools' acid treatment packages on filter cakes deposited by an invert emulsion consisting of a 10 lb/gal (1.2 kg/liter) oil-based mud (OBM). Tables I, II, and III show permeability data after tests performed on 3 and 20 μm ceramic discs and Berea sandstone in a Disc-Sandpack Permeameter. As the data below illustrate, the chemical techniques of removing filter cake damage and avoiding sludge damage has been demonstrated by performing a series of water injection tests. Water injection testing was chosen because this type of test mimics a "worse case" scenario and more easily exposes incomplete clean up results.

Phase I: Testing the Concept with a "Two-Step" Soak Procedure (Soak without Acid Followed by Conventional Acidification Process)

The first phase of testing consisted of filter cake deposition on 3, 10, 20 and 35 μm ceramic discs followed by treatment with a formulation, such as Exp-298 and DFE 734, a concentrate used to form the in situ single phase microemulsion. Both Exp-298 and DFE 734 are proprietary surfactants blend from Baker Hughes Drilling Fluids that contains a blend of surfactant with co-surfactants and water.

Figure 1:
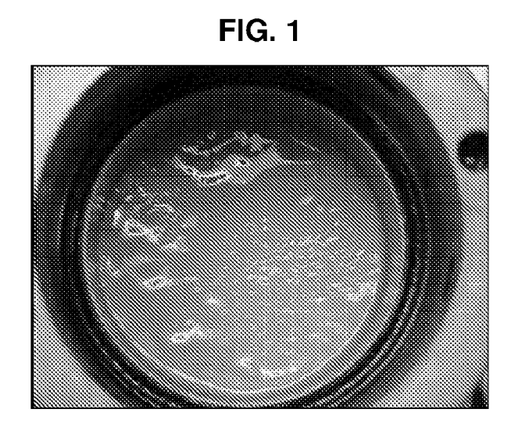
FIG. 1 is a photograph of typical OBM filter cake appearance after mud-off at 140° F. (60° C.) and 500 psi (3.4 MPa)

The first part of the test was the measurement of initial permeability. After establishing the initial seawater injection permeability, a mud-off was performed to deposit a filter cake for subsequent destruction by the soak solution. The cake deposition time for these tests was 3 hours. The purpose of a 3-hr mud-off, at 140° F. (60° C.), 150° F. (66° C.) or 194° F. (90° C.) and 500 psi (3.4 MPa) was to have a filter cake that had a reasonable thickness to "break", in order to verify the efficacy of the single phase microemulsion technology. Typical mud cake appearance after mud-off at 150° F. (60° C.) and 500 psi (3.4 MPa) is shown in the FIG. 1 photograph. After removing the mud from the cell and verifying that a good filter cake was deposited on the disc, the soak solution was carefully added and allowed to destroy the cake. Each soak solution contained 20% volume DFE 734 in CaCl$_2$ brine or in NaCl brine was allowed to soak at constant temperature (140° F. (60° C.), 150° F. (66° C.) or 194° F. (90° C.)) and 360 psi (2.5 MPa) overbalanced for 3.0 hours. The OBM mud was purposely formulated with at least 50 lb/bbl (143 g/liter) of calcium carbonate in anticipation of follow-up acid soak treatments.

Figure 2:
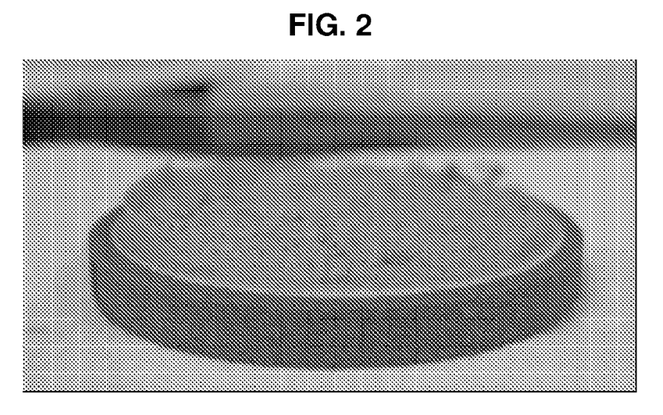
FIG. 2 is a photograph of the OBM filter cake of FIG. 1 after soaking.
Figure 3:
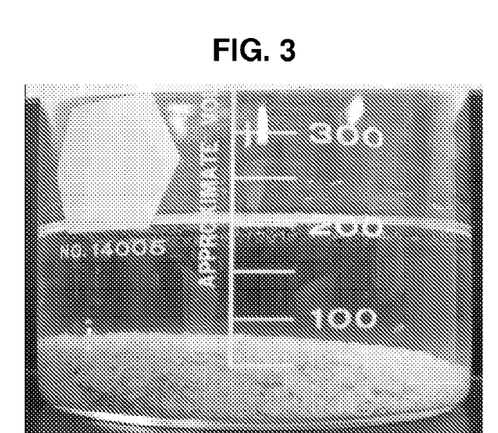
FIG. 3 is a photograph of part of the remaining filter cake particles after testing in fresh water to observe its potential for dispersion or water-wet condition.

After the disc was removed from the cell, the filter cake was observed and photographed (FIG. 2). Part of the remaining filter cake particles was tested in fresh water to observe its potential for dispersion or water-wet condition (seen in FIG. 3). It was observed that the filter cakes were dispersed completely in water. The disc with the remaining filter cake particles were placed in acid in order to observe the dissolution of calcium carbonate. The generation of CO$_2$ gas was further evidence that the particles in the filter cake were water-wet by the soak solution. Table I shows results of the injection permeability tests using 20% DFE 734 in 10 lb/gal (1.2 kg/liter) CaCl$_2$ brine and 15% DFE 734 in 9.3 lb/gal (1.1 kg/liter) NaCl brine.

TABLE I

Water Injection Permeability Test Results
DFE 734/in situ Single Phase Microemulsion
Sandpack Permeameter/three-hour mud-off
on ceramic disc/leak-off valve closed

| Test without acid | Initial Permeability | Final Permeability | % Injection Permeability |
|---|---|---|---|
| Test #1 - 20% DFE 734 in 10 lb/gal (1.2 kg/liter) CaCl$_2$ 20 hours soak at 140° F. (60° C.) and 360 psi (2.5 MPa) on 3 μm disc | | | |
| | 277.9 | 314.7 | 113.2 |
| Test #2 - 15% DFE 734 in 9.3 ppg NaCl 20 hours soak at 150° F. (66° C.) and 360 psi (2.5 MPa) on 20 μm ceramic disc | | | |
| | 280.7 mD | 253.8 mD | 90.4 |

Conclusions of "Two-Step" Soak Procedure (Soak without Acid Followed by Conventional Acidification Process)

Phase I results suggest (94 to >100% water injection permeability) that the single phase microemulsion alters the filter cake (FIG. 2) so that when an acid treatment is added, the calcium carbonate particles can be dissolved by the acid without creating an unwanted sludge between the original OBM emulsion filter cake and the CaCl$_2$ brine single phase microemulsion.

The results in Tests 1 and 2 indicate that after the application of soak solution, the damage is removed as evidence by the high % injection permeability. The baseline test using only brine as a soak resulted in 0% injection permeability.

In summary, a two-step treatment consisting of an in situ microemulsification followed by an acid package (such as that previously identified in one non-limiting embodiment) will effectively release stuck pipe.

Phase 2: Testing the "One-Step" Soak Concept in the Sand Pack Permeameter

The second phase of the testing consisted of soaking the OBM filter cakes with blends of DFE 734 and an acid in brine. Tests were conducted with KCl, NaCl, HCOOK and NaBr. Examples using the blend of DFE 734 and acetic acid in CaCl$_2$ brine are shown in Table II and III.

The final density of the brines used in the tests of Table II and Table III were 10 lb/gal (1.2 kg/liter).

The first part of the test is the measurement of initial permeability. After establishing the initial seawater injection permeability, a 3-hour mud-off was performed to deposit a filter cake for subsequent destruction by the soak. After removing the mud from the cell and verifying that a good filter cake was deposited on the disc, the soak solution was carefully added and allowed to destroy the cake. The overbalanced pressure on the cake was 360 psi (2.5 MPa). A few pore volumes of filtrate were collected. Then, the solution was allowed to soak overnight with the valve closed. The next morning, the valve was opened in order to collect all of the filtrate. Next, seawater was pumped through the cell, forcing the residual soak solution through the disc. When the flow volume became stabilized, the test was terminated and the final water injection permeability was calculated.

Table II show the results of injection permeability performed with 20% DFE 734 and 10% formic acid in 10 lb/gal (1.2 kg/liter) calcium chloride brine. Table III show the results of injection permeability using a blend of 10% Acidgen HA+2% CS GBS-1 to generate acetic acid in 20% DFE 734 in 10 lb/gal (1.2 kg/liter) calcium chloride brine. This is an example of acetic acid being generated in situ in accordance with one optional embodiment of the method herein.

TABLE II

Water Injection Permeability Test Results
DFE 734/in situ Single Phase Microemulsion
Sandpack Permeameter/three-hour mud-off
on ceramic disc/leak-off valve closed
Test #3-20% DFE 734 and 10% formic acid in 10 lb/gal
CaCl$_2$ (1.2 kg/liter) 20 hours soak at 140° F. (60° C.) and
360 psi (2.5 MPa) on 3 μm disc

| Test with 10% formic acid | Initial Permeability | Final Permeability | % Injection Permeability |
|---|---|---|---|
| | 201.4 mD | 358.1 | 177.6 |

TABLE III

Water Injection Permeability Test Results
DFE 734/in situ Single Phase Microemulsion
Sandpack Permeameter/three-hour mud-off on 20 μm ceramic disc
and leak-off valve open
Test #4-20% DFE 734 with in 10 lb/gal (1.2 kg/liter)
CaCl$_2$ formulated with an in situ acid generator.
Soak at 194° F. (90° C.) and 360 psi (2.5 MPa) on 20 μm disc
Test with leak-off valve open

| Test with 10% Acidgen HA + 2% CS GBS-1 | Initial Permeability | Final Permeability | % Injection Permeability |
|---|---|---|---|
| | 684 mD | 661.5 mD | 96.7 |

Conclusions of "One-Step" Soak Procedure

Phase 2: Conclusions

Phase 2 demonstrated an important concept for the methods herein. The "one-step" in situ single phase microemulsion soak solution composed of completion brine, 20% of the DFE 734 and 10% acid is compatible and works simultaneously to prepare a sand face for injection or production.

Filtration Tests

Filtration tests were performed in a double-ended HPHT (high-pressure, high-temperature) filtration cell using an 11.0 lb/gal (1.3 kg/liter) OBM drill-in fluid. The procedure includes a 3-hour mud-off at 500 psi (3.4 MPa) and 150° F. (66° C.) to deposit a filter cake.

After removing the mud from the cell and verifying that a good filter cake was deposited on the disc, the soak solution was added. Then, the cell was closed again and 200 psi (1.4 MPa) pressure was applied on the filter cake. The leak-off valve was opened to collect the filtrate as a function of time.

Figure 4:
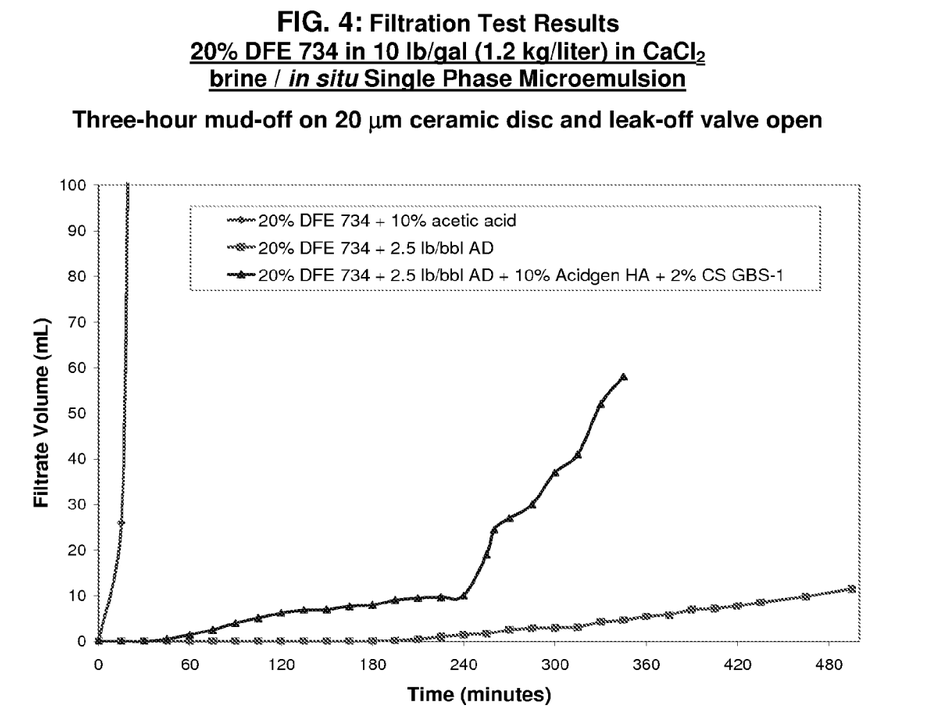
FIG. 4 is a graph of filtration test results for 20% DFE 734 in 10 lb/gal (1.2 kg/liter) $CaCl_2$ brine with an in situ single phase microemulsion using a 3-hour mud-off on a 20 µm ceramic disk with the leakoff valve open, with and without an additive for delayed action (AD)
Figure 5:
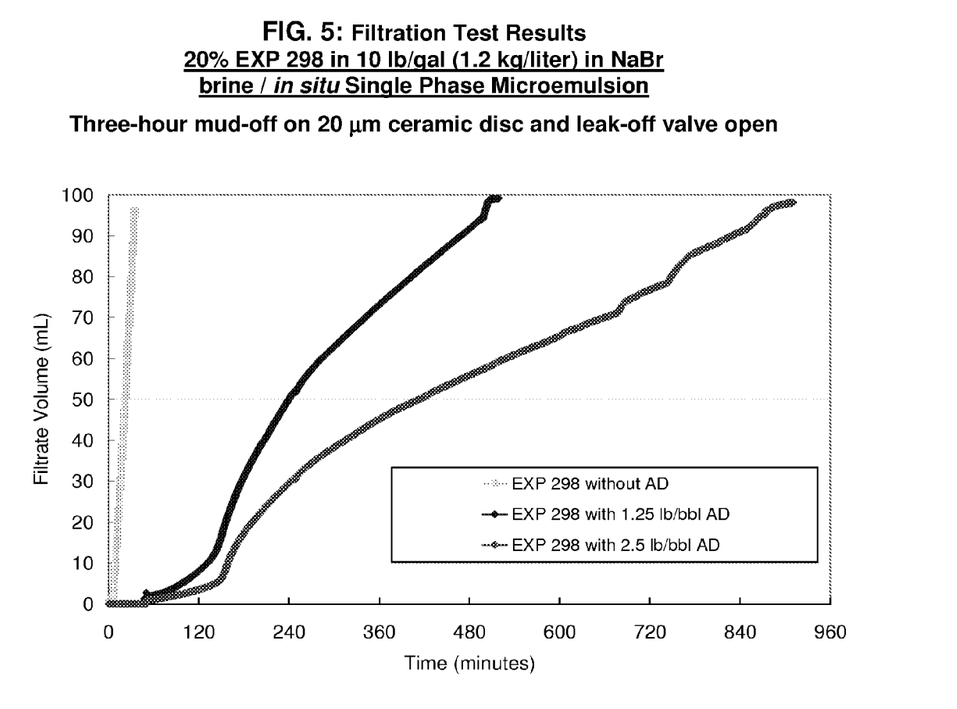
FIG. 5 is a graph of filtration test results for 20% EXP 298 in 10 lb/gal (1.2 kg/liter) NaBr brine with an in situ single phase microemulsion using a 3-hour mud-off on a 20 µm ceramic disk with the leakoff valve open, with and without an additive for delayed action (AD)
Figure 6:
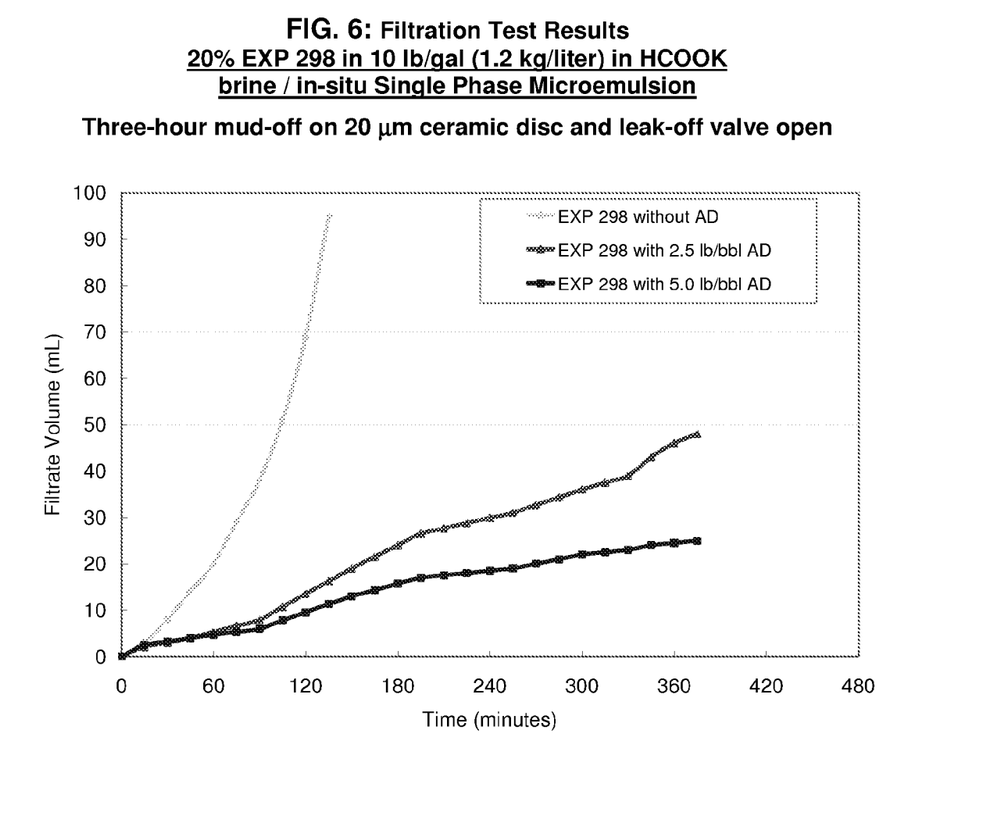
FIG. 6 is a graph of filtration test results for 20% EXP 298 in 10 lb/gal (1.2 kg/liter) HCOOK brine with an in situ single phase microemulsion using a 3-hour mud-off on a 20 µm ceramic disk with the leakoff valve open, with and without an additive for delayed action (AD)
Figure 7:
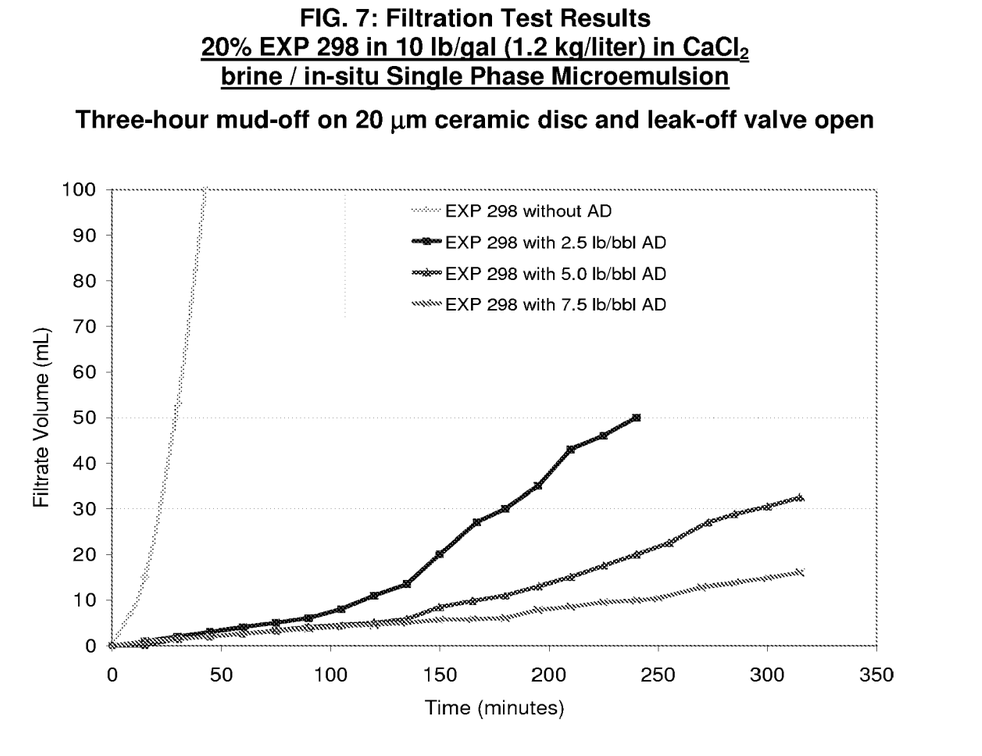
FIG. 7 is a graph of filtration test results for 20% EXP 298 in 10 lb/gal (1.2 kg/liter) $CaCl_2$ brine with an in situ single phase microemulsion using a 3-hour mud-off on a 20 µm ceramic disk with the leakoff valve open, with and without an additive for delayed action (AD)

The soak solutions of 20% (v/v) of EXP 298 in 10 lb/gal (1.2 kg/liter) brine or 20% (v/v) of DFE 734 in 10 lb/gal (1.2 kg/liter) was used for filtration tests. Results of the filtration tests using soak solutions formulated with the EXP 298 or DFE 734 and NaBr, CaCl$_2$ or HCOOK brine described in Table IV are presented in FIGS. 4, 5, 6 and 7. In FIG. 4, the last example uses 10% Acidgen HA acetic acid generator together with 2% CS GBS-1 catalyst to trigger the acid generation. Acidgen HA is available from Cleansorb LTD, and CS GBS-1 is also available from Cleansorb LTD.

Figure 8:
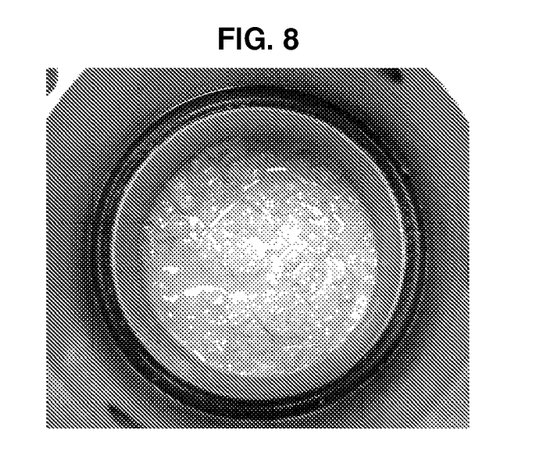
FIG. 8 is a photograph of a filter cake after treatment with DFE 734 in 10 lb/gal (1.2 kg/liter) $CaCl_2$ brine.

The filtration rates were controlled using an additive for delay. Upon removal of the filter cakes and discs, it was observed that the filter cakes were completely water wet, as evidenced by the easy dispersion of the cake particles in water (photograph of FIG. 8). When the filter cake samples were dispersed in water, no sheen was observed, indicating that all of the oil was incorporated into the soak solution.

TABLE IV

Formulations Used in Filtration Tests

| Additives | DFE 734 in 10 lb/gal (1.2 kg/liter) CaCl$_2$ | EXP 298 in 10 lb/gal (1.2 kg/liter) NaBr | EXP 298 in 10 lb/gal (1.2 kg/liter) HCOOK | EXP 298 in 10 lb/gal (1.2 kg/liter) CaCl$_2$ |
|---|---|---|---|---|
| Sodium bromide, wt % | — | 21.8 | — | — |
| Potassium formate, wt % | — | — | 33.7 | — |
| Calcium chloride, wt % | 23.1 | — | — | 23.1 |
| Water, wt % | 56.9 | 61.5 | 49.6 | 60.3 |
| *EXP 298, wt % | — | 16.7 | 16.7 | 16.7 |
| *DFE 734, wt % | 16.7 | | | |

*16.7% of DFE 734 and 16.7% of EXP 298 by weight are equivalent to 20% by volume Test Conditions:
Cake deposition in 20-microns disc: 10 lb/gal (1.2 kg/liter) SBM, 3 hour at 150° F. (60° C.) and 1000 psi (6.9 MPa).
Soak conditions: 200 psi (1.4 MPa), 150° F. (60° C.), leak-off valve open.

In summary, a number of conclusions may be reached.
1. The single phase microemulsion forming solution comprised of 10%-25% DFE 734 in brine forms an in-situ single phase microemulsion that appears to completely destroy the OBM portion of a filter cake. The filter cake loses all integrity and appears to become essentially entirely dislodged from the ceramic filter medium. Thus, this microemulsion would be suitable to free stuck pipe.
2. Other in-situ single phase microemulsion chemistry options are available. DFE 734 results in a CaCl$_2$ brine single phase microemulsion, while other surfactant options support the use of seawater, NaCl, or other brine types.
3. If the OBM is barite free or contains only acid soluble bridging components, the filter cake may be destroyed chemically by the single phase microemulsion chemistry and acid to allow for excellent injection rates.
4. The in-situ single phase microemulsion chemistry may be blended in brine containing an acid package to clean up the filter cake in a 1-step clean up process.
5. Static filter cakes deposited for long periods of time will require (1) either a high rate displacement to remove the enlarged, compacted external filter cake volume or (2) a longer soak time and a modified in-situ single phase microemulsion.
6. In one non-limiting embodiment, the decision to displace an OBM and to remove the filter cake to release stuck pipe may be reservoir-based and should be determined by such factors including, but not limited to, the nature of drilled solids, formation fluid compatibilities and operation considerations.
7. Forming the microemulsions (or other emulsions) in situ avoids using additional oil or solvent in the formulation, which in turn gives higher capacity for oil incorporation in the formed microemulsion and/or increased cleaning capability when the microemulsion contacts the OBM (or SBM) filter cake for releasing and freeing stuck equipment.

In the foregoing specification, the invention has been described with reference to specific embodiments thereof, and has been suggested as effective in providing effective methods and compositions for releasing stuck pipe and other equipment in a hydrocarbon wellbore. However, it will be evident that various modifications and changes may be made thereto without departing from the broader spirit or scope of the invention as set forth in the appended claims. Accordingly, the specification is to be regarded in an illustrative rather than a restrictive sense. For example, specific combinations of single phase microemulsion-forming components and other components for forming the in-situ fluids, such as surfactants, chelating agents, acids, solvents, non-polar liquids, etc. and proportions thereof falling within the claimed parameters, but not specifically identified or tried in a particular composition to improve the removal of filter cake particles herein, are anticipated to be within the scope of this invention. Further, although the invention is often discussed in terms of a method to release a stuck drill string, the method is expected to be useful to assist in freeing other downhole equipment as well.

The present invention may suitably comprise, consist or consist essentially of the elements disclosed and may be practiced in the absence of an element not disclosed.

The words "comprising" and "comprises" as used throughout the claims is to interpreted "including but not limited to".

What is claimed is:

1. A method for releasing a stuck drill string from a hydrocarbon reservoir wellbore comprising:
    drilling a wellbore with a drill string in a hydrocarbon reservoir with an OBM;
    forming a filter cake of OBM particles over at least part of the wellbore, which filter cake contacts the drill string to inhibit movement of the drill string;
    contacting the OBM and filter cake with a composition for a period of time sufficient to remove at least a portion of the OBM filter cake particles to permit free movement of the drill string, where the composition comprises at least one surfactant and water; and
    forming in situ an in-situ fluid selected from the group consisting of a water continuous miniemulsion, a water continuous nanoemulsion, and a bi-continuous single phase microemulsion (Winsor IV), where the in-situ fluid further comprises an acid selected from the group consisting of mineral acids, acetic acid, formic acid, polyamino carboxylic acids, salts of these acids and mixtures thereof, and thereby
    incorporating at least a portion of the oil in the filter cake particles into the in-situ fluid.

2. The method of claim 1 where the at least one surfactant is selected from the group consisting of non-ionic surfactants, anionic surfactants, cationic surfactants and amphoteric surfactants, surfactants containing a non-ionic spacer-arm central extension and an ionic or nonionic polar group, and mixtures thereof.

3. The method of claim 2 where in the surfactants:
    the nonionic surfactants are selected from the group consisting of alkyl polyglycosides, sorbitan esters, amine ethoxylates, diamine ethoxylates, methyl glucoside esters, polyglycerol esters, alkyl ethoxylates, alcohols that have been polypropoxylated, alcohols that have been ethoxylated, and alcohols that have been propoxylated and ethoxylated;
    the anionic surfactants are selected from the group consisting of alkali metal alkyl sulfates, alkyl or alkylaryl sulfonates, linear or branched alkyl ether sulfates and sulfonates, alcohol polypropoxylated sulfates, alcohol polyethoxylated sulfates, alkyl or alkylaryl disulfonates, alkyl disulfates, alkyl sulphosuccinates, alkyl ether sulfates, linear and branched ether sulfates;
    the cationic surfactants are selected from the group consisting of arginine methyl esters, alkanolamines, and alkylenediamides, and mixtures thereof, and
    surfactants containing a non-ionic spacer-arm central extension and an ionic or nonionic polar group.

4. The method of claim 1 where the in-situ fluid further comprises brine containing salts selected from the group consisting of inorganic salts, organic salts and combinations thereof.

5. The method of claim 1 where the bi-continuous single phase microemulsion, water continuous miniemulsion, or water continuous nanoemulsion is a macroscopically homogeneous mixture of at least three components, where the three components comprise: a polar phase from the water, a non-polar phase from the OBM or filter cake and the at least one surfactant.

6. The method of claim 1 where the filter cake particles are selected from the group consisting of calcium carbonate, hematite, ilmenite, manganese tetroxide, manganous oxide, iron carbonate, magnesium oxide, barium sulfate, and mixtures thereof.

7. The method of claim 1 further comprising generating the acid in situ.

8. A method for releasing a stuck drill string from a hydrocarbon reservoir wellbore comprising:
   drilling a wellbore with a drill string in a hydrocarbon reservoir with an OBM;
   forming a filter cake of OBM particles over at least part of the wellbore, which filter cake contacts the drill string to inhibit movement of the drill string;
   contacting the OBM and filter cake with a composition for a period of time sufficient to remove at least a portion of the OBM filter cake particles to permit free movement of the drill string, where the composition comprises at least one surfactant and water, in an absence of introduced oil or solvent; and
   forming in situ an in-situ fluid selected from the group consisting of a water continuous miniemulsion, a water continuous nanoemulsion, and a bi-continuous single phase microemulsion (Winsor IV), where the in-situ fluid further comprises an acid selected from the group consisting of mineral acids, acetic acid, formic acid, polyamino carboxylic acids, salts of these acids and mixtures thereof, and thereby,
   incorporating at least a portion of the oil in the filter cake particles into the in-situ fluid, where the at least one surfactant is selected from the group consisting of non-ionic surfactants, anionic surfactants, cationic surfactants and amphoteric surfactants, surfactants containing a non-ionic spacer-arm central extension and an ionic or nonionic polar group, and mixtures thereof.

9. The method of claim 8 where in the surfactants:
   the nonionic surfactants are selected from the group consisting of alkyl polyglycosides, sorbitan esters, amine ethoxylates, diamine ethoxylates, methyl glucoside esters, polyglycerol esters, alkyl ethoxylates, alcohols that have been polypropoxylated, alcohols that have been ethoxylated, and alcohols that have been propoxylated and ethoxylated;
   the anionic surfactants are selected from the group consisting of alkali metal alkyl sulfates, alkyl or alkylaryl sulfonates, linear or branched alkyl ether sulfates and sulfonates, alcohol polypropoxylated sulfates, alcohol polyethoxylated sulfates, alkyl or alkylaryl disulfonates, alkyl disulfates, alkyl sulphosuccinates, alkyl ether sulfates, linear and branched ether sulfates;
   the cationic surfactants are selected from the group consisting of arginine methyl esters, alkanolamines, and alkylenediamides, and mixtures thereof, and
   surfactants containing a non-ionic spacer-arm central extension and an ionic or nonionic polar group.

10. The method of claim 8 where the bi-continuous single phase microemulsion, water continuous miniemulsion or water continuous nanoemulsion is a, macroscopically homogeneous mixture of at least three components, where the three components comprise: a polar phase from the water, a non-polar phase from the OBM or filter cake and the at least one surfactant.

11. The method of claim 8 where the filter cake particles are selected from the group consisting of calcium carbonate, hematite, ilmenite, manganese tetroxide, manganous oxide, iron carbonate, magnesium oxide, barium sulfate, and mixtures thereof.

12. The method of claim 8 further comprising generating the acid in situ.

13. A method of releasing a stuck drill string from a hydrocarbon reservoir wellbore comprising:
   drilling a wellbore with a drill string in a hydrocarbon reservoir with an OBM;
   forming a filter cake of OBM particles over at least part of the wellbore, which filter cake contacts the drill string to prevent or undesirably inhibit movement of the drill string;
   contacting the OBM and filter cake with a composition for a period of time sufficient to remove at least a portion of the OBM filter cake particles to permit free movement of the drill string, where the composition at least one surfactant and a brine, in the absence of a co-solvent, in an absence of introduced oil or solvent; and
   forming in situ an in-situ fluid selected from the group consisting of a brine continuous miniemulsion, a brine continuous nanoemulsion, and a bi-continuous single phase microemulsion (Winsor IV), where the in-situ fluid further comprises an acid selected from the group consisting of mineral acids, acetic acid, formic acid, polyamino carboxylic acids, salts of these acids and mixtures thereof, and thereby
   incorporating at least a portion of the oil in the filter cake particles into the in-situ fluid;
   where the bi-continuous single phase microemulsion, brine continuous miniemulsion, or brine continuous nanoemulsion is a thermodynamically stable, macroscopically homogeneous mixture of at least three components, where the three components comprise: brine, a nonpolar phase from the OBM or filter cake and the at least one surfactant, and where the filter cake particles are selected from the group consisting of calcium carbonate, hematite, ilmenite, manganese tetroxide, manganous oxide, iron carbonate, magnesium oxide, barium sulfate, and mixtures thereof.

14. The method of claim 13 where the at least one surfactant is selected from the group consisting of non-ionic surfactants, anionic surfactants, cationic surfactants and amphoteric surfactants, surfactants containing a non-ionic spacer-arm central extension and an ionic or nonionic polar group, and mixtures thereof.

15. The method of claim 14 where in the surfactants:
   the nonionic surfactants are selected from the group consisting of alkyl polyglycosides, sorbitan esters, amine ethoxylates, diamine ethoxylates, methyl glucoside esters, polyglycerol esters, alkyl ethoxylates, alcohols that have been polypropoxylated, alcohols that have been ethoxylated, and alcohols that have been propoxylated and ethoxylated;
   the anionic surfactants are selected from the group consisting of alkali metal alkyl sulfates, alkyl or alkylaryl sulfonates, linear or branched alkyl ether sulfates and sulfonates, alcohol polypropoxylated sulfates, alcohol polyethoxylated sulfates, alkyl or alkylaryl disulfonates, alkyl disulfates, alkyl sulphosuccinates, alkyl ether sulfates, linear and branched ether sulfates;
the cationic surfactants are selected from the group consisting of arginine methyl esters, alkanolamines, and alkylenediamides, and mixtures thereof, and
surfactants containing a non-ionic spacer-arm central extension and an ionic or nonionic polar group.

* * * * *